M. L. Wright,
Making Teeth.
Nº 18,005.   Patented Aug. 11, 1857.

UNITED STATES PATENT OFFICE.

MARTIN LUTHER WRIGHT, OF CLEVELAND, OHIO.

SETTING PORCELAIN TEETH.

Specification of Letters Patent No. 18,005, dated August 11, 1857.

*To all whom it may concern:*

Be it known that I, MARTIN LUTHER WRIGHT, of Cleveland, in the county of Cuyahoga and State of Ohio, have invented new and useful Improvements in the Manufacture of Porcelain Teeth; and I do hereby declare that the following is a full and complete description of the same, reference being had to the accompanying drawings, making a part of this specification.

Figure 2:
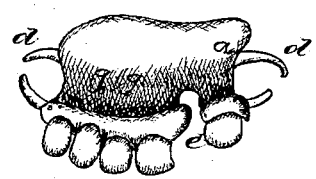
Figure 3:
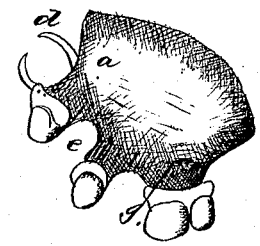
Figure 1:
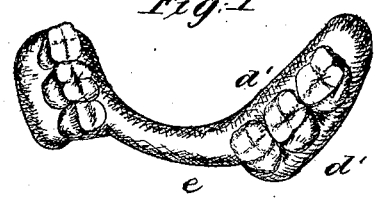

Figure 1 is a representation of a block of teeth for the lower jaw, where the front teeth are permanent. Fig. 2 represents the front upper teeth and one eye tooth. Fig. 3 also represents an upper plate, with four teeth, where two skips are made.

To enable others skilled in the art to make and use my invention, I will proceed to describe the mode by which I prepare the material, and the manner in which the teeth are finished.

First, I get an accurate representation of the mouth which is to be supplied with teeth, and from this in the usual manner strike up a plate of the exact shape and superficial surface desired. This plate may be made of the thinnest kind of tin plate, such as is used by tinners, or any other soft and thin plate that will bear swaging can be used. Fit this plate accurately to the mouth of the patient. After it has been removed from the mouth the outer surface should be covered with beeswax, to make it of suitable thickness to supply all that has been lost by absorption consequent on the extraction of the teeth, and also to give strength and stability to the artificial piece about to be inserted. Wax should now be molded onto the plate which will show the length of the teeth and labial surface. Replace this plate and wax, in the mouth, and let the patient bite upon the wax, in a natural manner, to show the articulation of the teeth. Now remove this and get an accurately articulating model in the usual way. Then remove the wax and plate from which the carving model or mold is now to be made, which may be done very conveniently in the following described manner. Fill the concave surface of the plate with calcined gypsum made into a thin paste with water, and extend it back to a convenient length, say three inches back of the back part of the plate, and of the thickness of half an inch or more, trim it nicely after it has set, (not dried). The plate and wax may now be removed, and the first or male part of the model may be made. The modeled porcelain plate Figs. 1, 2 and 3, when fully vitrified, and the enamel fused, will have shrunk one-sixteenth, no more nor no less. This unavoidable shrinkage must now be provided for by an enlargement of the cast, bearing in mind that the material forming the porcelain plate, shrinks one sixteenth (1/16) in every direction. Those who are accustomed to work porcelain, and particularly block work, will find no difficulty in providing for this shrinkage, for it is done the same as any block work. namely, by enlarging the mold in every direction, by building on to the convex surfaces, extending the lateral ones, and by removing matter from the concave surfaces. Skill and experience will be required in this operation. Now that the first or male part of the model is prepared, the other half may be made by pouring calcined plaster (gypsum) mixed with water onto the first or male part, and thus I have a mold for the porcelain. This porcelain should be of the very best quality, and prepared for use by mixing the pulverized material with pure water, until it acquires a plastic consistency. From this plastic material, form upon the mold, and curve out the case of teeth and plate as seen in Figs. 1, 2 and 3, or to suit the particular mouth for which they are designed, when the case has been thus formed all of porcelain carved and prepared, platinum pins may be interwoven, as seen in Figs. 2 and 3, at *a*, *a*, in such cases as require a more firm support than can readily be secured by atmospheric pressure alone. The pins serve as points to which can be attached gold or platinum springs or clasps, which can pass around adjoining permanent teeth, as seen at *d*, *d*.

The cases thus carved and prepared are now to be removed to a tile on which kaolin of half an inch thickness has been placed, and then placed in the furnace for crucing, which requires about 2,000° F. After cooling it is then ready for the appropriate enamels, which should be applied in the usual manner. Then pack it as before and put it in the furnace for its final burn, which will require a heat equal to 3,700° F. When burned sufficiently, drop the fire, and let it cool down in the furnace. In order to increase the atmospheric pressure, and thus form more points of attachment, I drill small holes into the plate opposite the tooth as shown in Figs. 2 and 3, letter $g$, $g$, and when the plate is worn or in use, the flesh of the gums, by the exhausting the air, is pressed into these openings which should not exceed say the 1/10 of an inch in diameter or depth. After constant use for some time, this enlargement of flesh becomes permanent, and affords an additional support.

A partial under set, where the front teeth are perfect, as is shown in Fig. 1, should be so formed, that the porcelain uniting the two sides, will fall a trifle below the union of the gums, with the teeth, and fall as low down as is convenient, that part may be made quite thick, say one-fourth of an inch without any inconvenience to the patient, as the tongue is above the thick part, the sides on the inner and outer edges will need to be full, to compensate for the absorption of the alviola process, and the gums, as shown at $d'$, $d'$, Fig. 1.

The body, or material which I consider best suited for the kind of work above described, is composed of two parts silex, and seven parts of feldspar, prepared by pulverizing in the usual manner. It may be colored by using the oxid of uranium or the oxid of titanium, one or both, according to the fancy of the operator, or the shade of color required.

I do not claim the carving of full sets of teeth, out of one piece of porcelain material, or half sets of teeth out of the same, nor of block work to be united to a metallic base, nor the molding or modeling of porcelain material around porcelain teeth on a porclean base, for full sets or full half sets of teeth, but—

What I do claim as my invention and desire to secure by Letters Patent, is—

The making of parts of full sets, or parts of half sets of teeth for either the upper or under jaw, where one or more teeth are good and permanent, and where one, two, or more may be skipped as seen at $e$, $e$, $e$, Fig. 1, 2, and 3, making the whole plate and teeth of one piece of porcelain in the manner described.

MARTIN LUTHER WRIGHT.

Witnesses:
I. BRAINERD,
G. B. TIBBIT.